July 7, 1931. M. T. FORKER 1,813,392
LOCOMOTIVE BOOSTER APPARATUS
Filed Nov. 12, 1927 2 Sheets-Sheet 1
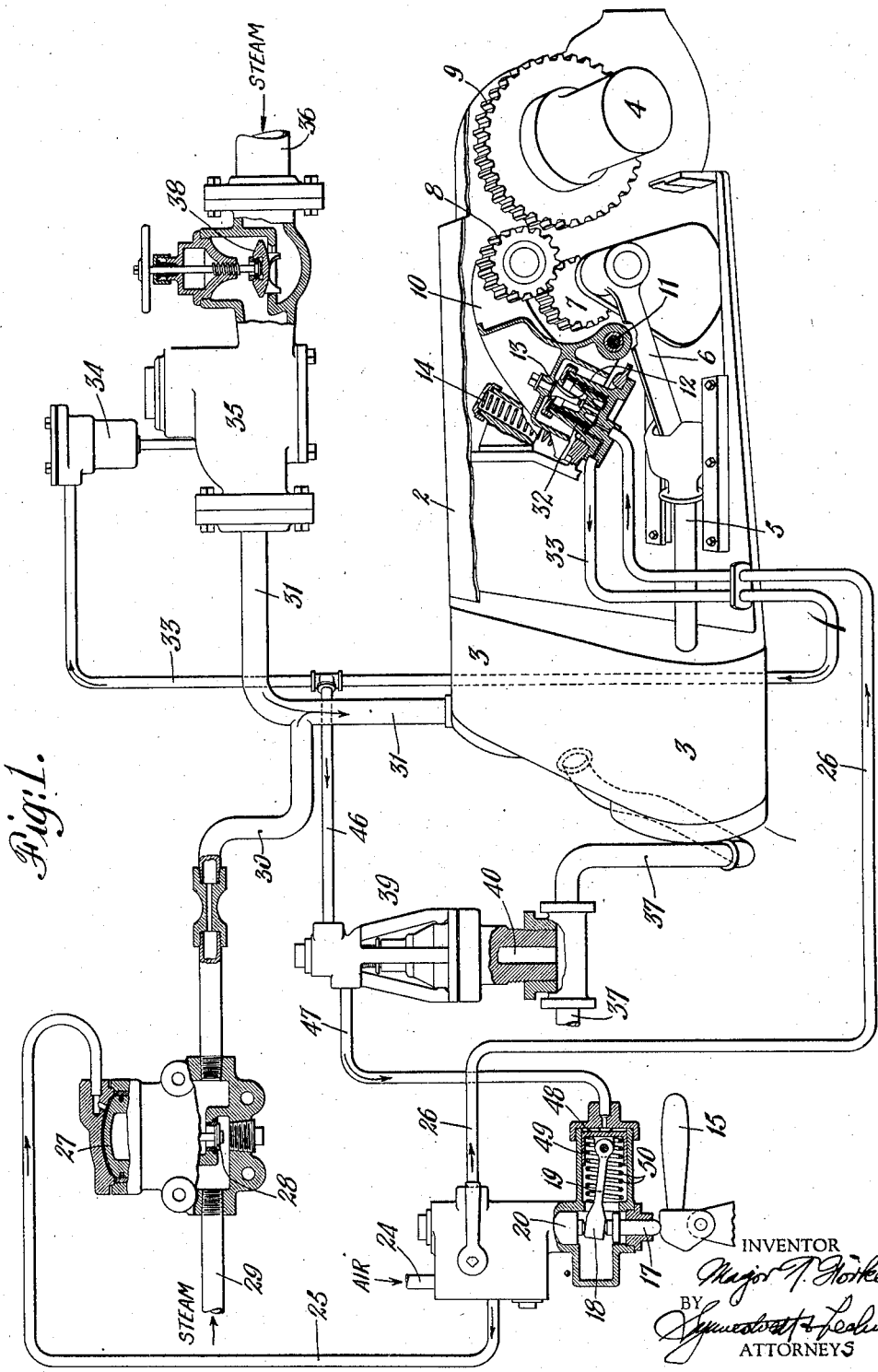

July 7, 1931.  M. T. FORKER  1,813,392
LOCOMOTIVE BOOSTER APPARATUS
Filed Nov. 12, 1927  2 Sheets-Sheet 2
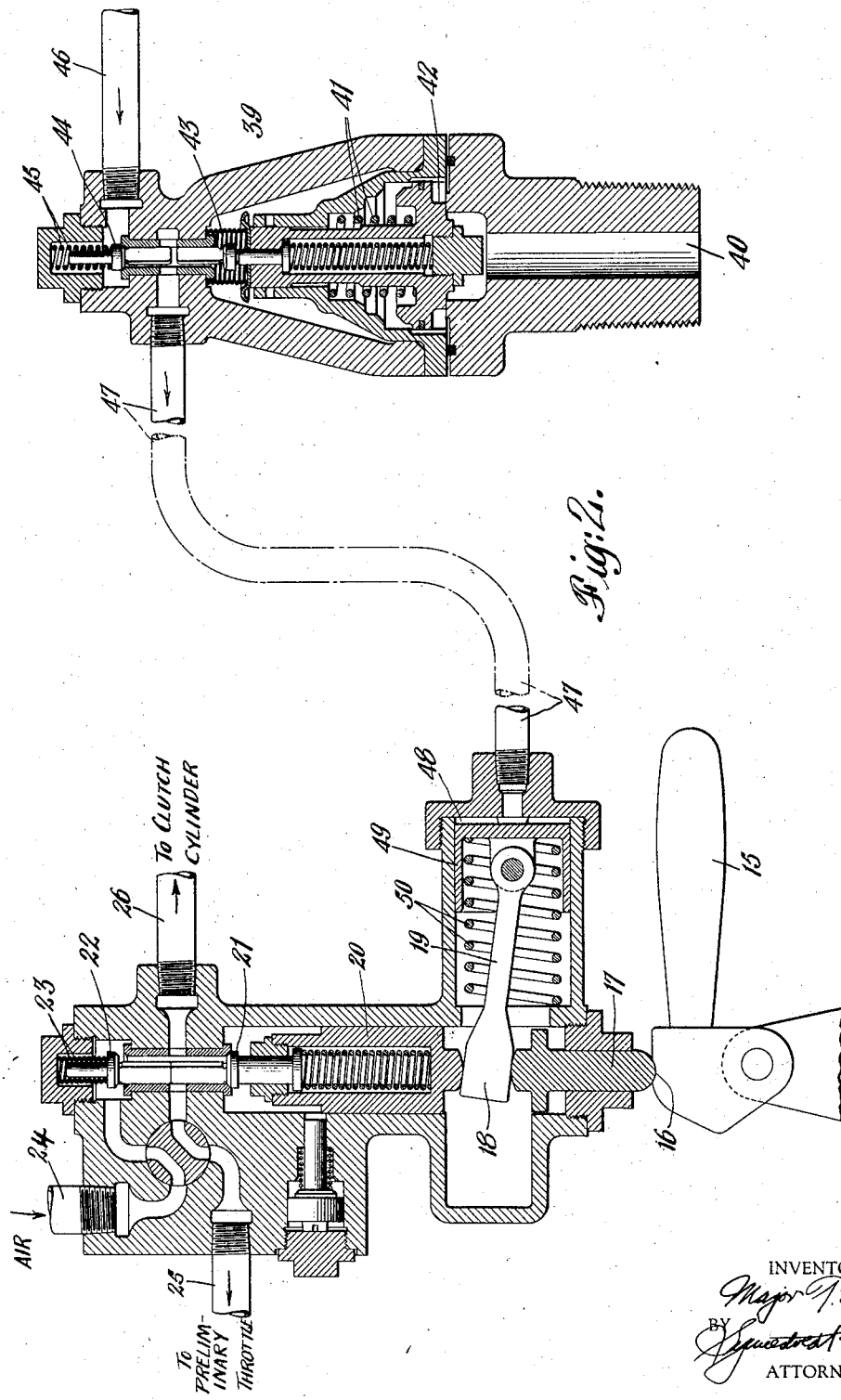

Patented July 7, 1931

1,813,392

UNITED STATES PATENT OFFICE

MAJOR T. FORKER, OF LOOMIS, NEW YORK, ASSIGNOR TO FRANKLIN RAILWAY SUPPLY COMPANY, OF NEW YORK, N. Y., A CORPORATION OF DELAWARE

LOCOMOTIVE BOOSTER APPARATUS

Application filed November 12, 1927. Serial No. 232,873.

This invention relates to locomotive booster apparatus, and more particularly to automatic cutout or disabling mechanism for booster motors.

Among the primary objects of the invention are: the protection of the booster motor itself and its associated parts; the simplification of the operation of booster-equipped locomotives; and the conservation of steam in the operation of the locomotive.

More specifically, the invention contemplates, for the attainment of the foregoing and other objects and advantages, the provision of new and improved mechanism automatically cutting the booster motor out of operation when the engine attains a predetermined speed, and particularly the provision of apparatus under the influence of the exhaust pressure of the booster itself to cut the same out of operation.

How I attain the foregoing, and such other objects and advantages as are incident to the invention or will occur to those skilled in the art, will clearly appear hereinafter, reference being had to the accompanying drawings, in which:

Fig. 1 is a diagrammatic layout of a booster motor apparatus embodying my invention, certain parts being broken away and others shown in section; and Fig. 2 is an enlarged sectional view of a portion of the mechanism of Fig. 1, illustrating features of the invention in detail.

Referring first to Fig. 1, it will be seen that I have therein illustrated a booster motor 2, of well-known construction, having cylinders 3, 3, in which pistons (not shown) reciprocate to drive an axle 4 (of the locomotive or tender, or other vehicle), thru the medium of piston rods 5, connecting rods 6, and the usual gears 7, 8, 9. Gear 8, known as the idler gear, is mounted on the rocking arm 10 which is pivoted at 11, so that the gear may be thrown into or out of mesh with gear 9 on the axle to be driven.

The idler gear is adapted to be thrown into mesh with the axle gear by means of fluid pressure admitted to cylinder 12 behind piston 13, and adapted to be thrown out of mesh by means of spring 14 when the pressure in the cylinder 12 is exhausted therefrom.

Referring now to Figs. 1 and 2, the booster is put into operation by raising the pivoted booster latch 15 to the position shown, the notch 16 of which latch engages the plunger 17 and raises it. The plunger, operating on the head 18 of the interlocking latch 19, raises spring cage 20, seating valve 21 and unseating valve 22, which latter is otherwise held closed by spring 23.

Air or other fluid pressure is thereby admitted, from any suitable source of supply (not shown) through pipe 24 to pipes 25 and 26, the fluid passing thru the former (pipe 25) actuating piston 27 to open the preliminary booster throttle valve 28 to permit steam from pipe 29 to pass thru pipe 30 into pipe 31 to the booster to operate the same at idling speed, and the fluid passing thru the latter (pipe 26) actuating the piston 13 in the clutch cylinder 12 to throw gear 8 into mesh with gear 9.

As piston 13 moves in the clutch cylinder 12, it uncovers a port 32, permitting fluid to pass from the cylinder into pipe 33 and thence to a suitable valve operating device 34, which operates the usual main booster throttle valve 35 to admit full steam pressure from the supply line 36 to the pipe 31 leading to the booster cylinders. The booster is then in full operation, the exhaust thereof passing out thru the pipe 37. Valve 38 is a supplementary shut-off valve in the supply line 36, said line being preferably connected to the locomotive dry pipe under control of the main throttle of the locomotive.

For throwing the booster out of operation I have provided an automatic control valve mechanism 39 having a connection 40 tapped into the exhaust line 37 of the booster. This valve device is operated by the exhaust pressure from the booster, such exhaust pressure in the ordinary booster increasing with an increase in speed. The valve device can be so regulated as to operate at that booster exhaust pressure which is attained at the particular locomotive speed at which it is most desirable to have the booster cut out of operation. Such regulation may be obtained by adjusting the pressure of spring 41.

When the exhaust pressure of the booster rises to the predetermined degree it moves piston 42 of the control valve mechanism, seating valve 43, and opening valve 44 which is normally seated by spring 45. This action permits air from pipe 33 thru take-off 46 to pass into pipe 47 leading to the cylinder 48 of the interlocking latch mechanism, whereupon the piston 49 is moved, overcoming the pressure of spring 50 and moving the interlocking latch to the left so that its head 18 is no longer positioned between plunger 17 and spring cage 20. In other words the latch is tripped or released by the displacement of its head (member 18) from between the members 17 and 20. The cage 20 then drops, permitting the closure of valve 22 which shuts off the air supply from the entire booster mechanism, thus closing the booster throttles and unmeshing the booster gears; in other words, disabling or putting the booster entirely out of operation.

Upon the relieving of the pressure on plunger 17 when the cut-out latch moves to the left, the booster latch handle 15 drops to inoperative position.

Upon cutting out of the booster, in the manner above described, the interlocking latch is automatically reset, as follows: The air in interlocking cylinder 48 is exhausted thru pipe 47 and valve 43 to the atmosphere, and spring 50 thereupon moves the interlocking latch 19 to the right, where its head 18 is again in position to operate spring cage 20 whenever booster latch handle 15 is moved up again to horizontal position.

From the foregoing it will be evident that when the engineer desires to operate the booster, as in starting or during slow-speed operation of the locomotive, particularly on grades, all he need do is to raise the latch 15 to the position shown in the drawings. The booster will then go into operation, in the manner above described, and when the locomotive attains such a speed as will set up the predetermined pressure in the booster exhaust line, the automatic control valve mechanism 39 will operate to move the interlocking latch and cut out or disable the booster. Such automatic control obviously protects the booster and associated parts from overspeeding, simplifies the task of the enginemen, and saves steam by insuring the cutting out of the booster when its assistance is no longer required.

What I claim is:—

1. Locomotive booster apparatus comprising a booster motor and automatic disabling means therefor under the influence of the booster exhaust, including means for preventing automatic resumption of booster operation.

2. Locomotive booster apparatus comprising a booster motor and automatic disabling means therefor operable upon the attainment of a predetermined booster exhaust pressure, including means for preventing automatic resumption of booster operation.

3. Locomotive booster apparatus including booster control mechanism, means for admitting pressure fluid thereto including a latch and an interlocking latch, and release means for the interlocking latch.

4. Locomotive booster apparatus including booster control mechanism, means for admitting pressure fluid thereto including a latch and an interlocking latch, and release means for the interlocking latch under the influence of the booster exhaust.

5. Locomotive booster apparatus including booster control mechanism, means for admitting pressure fluid thereto including a latch and an interlocking latch, and release means for the interlocking latch including automatic control valve mechanism.

6. Locomotive booster apparatus including booster control mechanism, means for admitting pressure fluid thereto including a latch and an interlocking latch, and release means for the interlocking latch including automatic control valve mechanism actuated by the booster exhaust.

7. Locomotive booster apparatus including booster control mechanism, means for admitting pressure fluid thereto including a latch and an interlocking latch, and release means for the interlocking latch including automatic control valve mechanism actuated by the booster exhaust, together with resetting means for the interlocking latch.

8. Locomotive booster apparatus including booster control mechanism, means for admitting pressure fluid thereto including a latch and an interlocking latch, and release means for the interlocking latch including automatic control valve mechanism actuated by the booster exhaust, together with resetting means for interlocking latch operable upon cutting out the booster.

9. Locomotive booster apparatus including booster control mechanism, means for admitting pressure fluid thereto including a latch and an interlocking latch, and release means for the interlocking latch including automatic control valve mechanism actuated by the booster exhaust, together with resetting means for the interlocking latch operable upon cutting out of the booster and including spring means for moving the interlocking latch.

10. Locomotive booster apparatus including booster control mechanism, means for admitting pressure fluid thereto including a latch and an interlocking latch, and release means for the interlocking latch including a cylinder, a piston therein associated with the interlocking latch, and pressure actuating means for said piston.

11. Locomotive booster apparatus including booster control mechanism, means for admitting pressure fluid thereto including a latch and an interlocking latch, and release means for the interlocking latch including a cylinder, a piston therein associated with the interlocking latch, and pressure actuating means for said piston, together with resetting means for said interlocking latch.

12. Locomotive booster apparatus including booster control mechanism, means for admitting pressure fluid thereto including a latch and an interlocking latch, and release means for the interlocking latch including a cylinder, a piston therein associated with the interlocking latch, and pressure actuating means for said piston, together with resetting means for said interlocking latch including means for relieving the pressure on said piston.

13. Locomotive booster apparatus including booster control mechanism, means for admitting pressure fluid thereto including a latch and an interlocking latch, and release means for the interlocking latch including a cylinder, a piston therein associated with the interlocking latch, and pressure actuating means for said piston, together with resetting means for said interlocking latch including means for relieving the pressure on said piston operable upon cutting-out of the booster.

14. Locomotive booster apparatus including booster control mechanism, means for admitting pressure fluid thereto including a latch and an interlocking latch, and release means for the interlocking latch including a cylinder, a piston therein associated with the interlocking latch, and pressure actuating means for said piston, together with resetting means for said interlocking latch including tension means associated therewith.

15. Booster cut-out mechanism comprising, in combination with the booster control mechanism, an interlocking control associated therewith and booster-exhaust-operated means adapted to trip said latter control and disable the booster, together with means operable upon disabling of the booster to restore said control to normal position without restarting the booster.

16. Booster cut-out mechanism comprising, in combination with a booster control mechanism including means for starting and entraining the booster, an interlocking latch associated therewith and booster-exhaust-operated means adapted to trip said latch automatically and thereby disable the booster upon attainment of a predetermined exhaust pressure.

17. Booster automatic cut-out mechanism, comprising means yieldingly resistive to exhaust pressure, valve means associated therewith, and a fluid pressure-operated cut-out device, said valve means admitting pressure-fluid to said device upon movement of the yieldingly resistive means under the influence of the exhaust pressure.

18. Booster control mechanism comprising means for starting and entraining the booster including a control system subject to manual control and an interlocking automatic control device, and means for putting the booster out of operation including actuating means for said automatic device.

19. Booster control mechanism comprising means for starting and entraining the booster including an interlocking latch device, and means for putting the booster out of operation including actuating means for said latch device under the influence of the booster exhaust.

20. Booster control mechanism comprising means for starting and entraining the booster including an interlocking latch device, and means for putting the booster out of operation including actuating means for said latch device automatically operable by the booster exhaust pressure.

21. In control mechanism of the character described, an interlocking latch having a head normally positioned between operating parts of the mechanism and actuating means therefor adapted to move the latch and displace said head from between said parts, for the purpose specified.

22. In combination with a booster controlling system, fluid-admission means therefor, actuating mechanism for said means, latch means forming a part of said actuating mechanism normally positioned to effect opening of the fluid-admission means when said mechanism is moved, and means operable by the booster exhaust adapted to alter the position of said latch means to render the actuating mechanism ineffective for opening the fluid-admission means.

23. In combination, a normally disentrained booster motor, entraining mechanism therefor, mechanism for delivering steam thereto, and means under the influence of the booster exhaust for rendering both of said mechanisms ineffective.

24. In combination, a normally disentrained booster motor, entraining mechanism therefor, mechanism for delivering steam thereto, and means under the influence of the booster exhaust for rendering both of said mechanisms ineffective upon attainment of a predetermined booster exhaust pressure.

25. In combination with a booster motor, means for supplying starting steam thereto, means for entraining the booster, means for supplying full steam pressure to the booster upon establishment of a driving connection, and means under the influence of booster exhaust pressure for disabling all of said means.

26. In combination with a booster motor, means for supplying starting steam thereto, means for entraining the booster, means for supplying full steam pressure to the booster upon establishment of a driving connection, and means under the influence of booster exhaust pressure for disabling all of said means, together with manually operable means for re-establishing booster operation.

27. In combination with a booster motor, means for supplying starting steam thereto, means for entraining the booster, means for supplying full steam pressure to the booster upon establishment of a driving connection, and means under the influence of booster exhaust pressure for disabling all of said means, together with manually operable means for re-establishing booster operation, said last two means being operatively inter-related.

In testimony whereof, I have hereunto signed my name.

MAJOR T. FORKER.